United States Patent [19]

Jones

[11] Patent Number: 5,007,597

[45] Date of Patent: Apr. 16, 1991

[54] AUTOMATIC DISPENSER FOR ELONGATED FLEXIBLE COILED ELEMENTS

[76] Inventor: Johnnie L. Jones, 5650-10 Mile Rd., Rockford, Mich. 49341

[21] Appl. No.: 304,724

[22] Filed: Jan. 31, 1989

[51] Int. Cl.⁵ .................... B21C 47/18; B65H 49/34
[52] U.S. Cl. .................. 242/82; 242/75.1; 242/128
[58] Field of Search ............ 242/75.5, 75.51, 82, 242/128, 45, 105, 78.6, 54 R

[56] References Cited

U.S. PATENT DOCUMENTS

| | | |
|---|---|---|
| 527,879 | 10/1894 | Potter . |
| 2,006,819 | 7/1935 | Zschach . |
| 2,008,873 | 7/1935 | Nydegger ................. 242/45 |
| 2,331,662 | 10/1943 | Delano . |
| 2,346,917 | 4/1944 | Heger . |
| 2,361,192 | 10/1944 | Goodwin ................. 242/45 |
| 2,509,250 | 5/1950 | Roberts . |
| 2,650,771 | 9/1953 | Marion . |
| 3,069,107 | 12/1962 | Hirt . |
| 3,137,452 | 6/1964 | Winders . |
| 3,162,394 | 12/1964 | Culpepper et al. ........... 242/105 X |
| 3,233,397 | 2/1966 | Bonikowski . |
| 3,282,518 | 11/1966 | Holmes . |
| 3,289,959 | 12/1966 | Scher . |
| 3,436,031 | 4/1969 | Winders . |
| 3,476,330 | 11/1969 | Curtland . |
| 3,659,802 | 5/1972 | Agonis ................. 242/128 |
| 3,815,844 | 6/1974 | Wright et al. ........... 242/128 |
| 4,503,792 | 3/1985 | Cook . |
| 4,527,751 | 7/1985 | Grosz et al. . |
| 4,530,471 | 7/1985 | Inoue . |
| 4,566,646 | 1/1986 | Benjamin . |
| 4,574,574 | 3/1986 | Knaak . |
| 4,582,271 | 4/1986 | Takahashi . |
| 4,747,557 | 5/1988 | Fujimaki ............. 242/82 X |
| 4,773,610 | 9/1988 | Nordlof ............. 242/105 X |

FOREIGN PATENT DOCUMENTS

| | | | |
|---|---|---|---|
| 201397 | 12/1958 | Australia . | |
| 922296 | 3/1973 | Canada . | |
| 61975 | 10/1982 | European Pat. Off. ....... 242/45 |
| 1088462 | 3/1955 | France ................. 242/45 |

Primary Examiner—Joseph J. Hail, III
Attorney, Agent, or Firm—Price, Heneveld, Cooper, DeWitt & Litton

[57] ABSTRACT

An automatic dispensing machine for elongated flexible elements, such as a wire, string, rope, flat steel and the like in which the element being dispensed passes through a first guide member mounted for rotation substantially about the axis of rotation of a carrier. The guide member travels on at least a portion of a circular path in a position where the element can be easily pulled or dispensed off the carrier. A second guide member is provided through which the element is threaded prior to the demand source. The two guides are positioned so that a tension in the element induces rotation of the first guide member about the axis of rotation of the carrier. Rotation of the first guide member controls the speed of a variable speed drive member for rotating the carrier whereby greater tension on the element results in faster speed of rotation and faster rate of dispensing of the elements and vice versa. The first guide member not only controls the rate of dispensing but also takes up any normally expected slack of an element caused by slowing up the demand rate and/or stopping the demand.

17 Claims, 5 Drawing Sheets

AUTOMATIC DISPENSER FOR ELONGATED FLEXIBLE COILED ELEMENTS

BACKGROUND OF THE INVENTION

The present invention relates to an automatic dispensing machine capable of dispensing elongated flexible coiled elements such as wire from heavy spools or buckets in which the wire is wound about a central axis. This invention controls the unwinding of the elongated flexible element from a spool, drum, or loose coils particularly wherein the element is to be dispensed at high rates and intermittent and sporatic feed requirements. Typical uses of this type of automatic wire dispensers are for automatic welding machines or wire forming machines such as for springs and the like. In these types of industrial operations for welding operations or forming of springs, the feed requirements are sometimes drastically demanding of high rates of wire feed and intermittent and sporadic feed.

As related above, wire is generally wound on a spool, within a drum or is a loose coil. In all of these forms, the wire is wound in a coil shape about a central axis. Further, a wire spool, drum or loose coils generally contain a large quantity of wire; for example, a single wire spool, drum or loose coils can weigh up to as high as or more than 1000 lbs. Large coils of this size create problems because the weight requires a substantial force to start the coil rotating and when it once starts rotating the inertia force of the coil is high causing the problem of the coil wanting to continue rotating. Thus, in the start of the winding of the wire from a coil, some means has to be provided to rotate the coil at precisely the right time and speed and once the spool or drum starts rotating a brake means is generally required to slow down the rotation of the coil.

Failure to control the start up and the stopping of the coil and the speed of the coil in between creates quite some problems, particularly when it is desired to have a high speed of wire removal at certain times, lower speed at other times and/or intermittent and sporadic stopping and starting. An improper control has a deleterious effect upon the wire being dispensed by either stretching the wire or fouling up the wire when the rate it is being dispensed is too fast.

Still another problem with the use of large supply coils is that as the wire is withdrawn from the coil, the weight of the coil diminishes, resulting in a change in the inertia force that affects the starting and stopping and the variable dispensing requirements.

Extended efforts have been made by those skilled in the art to produce an automatic wire dispensing machine that solves all of the problems set forth above. Most of the attempts in controlling the dispensing of wire have employed a motor means on which the coil is located. The motor rotates the coil as the wire is being dispensed. The problem has been how to control the actuation and speed of the motor and also the inertia of the coil. Many attempts have been made to control the speed and the starting and stopping by a braking means. Some provide tension control devices that are intended to match the feed rate with the demand rate. Other machines have provided slack wire loops that permit the machine using the wire to make rapid and intermittent use of the wire while providing the wire feed at a more continuous rate. All of these machines are quite complicated, require adjustments to accommodate different sizes of wire, spools and drums and have unsuitable limitations on the rate the wire can be dispensed and the kind of wire.

One wire dispensing machine which has proven successful for certain rates of dispensing and for certain weights of spools and drums is disclosed in my patent application Ser. No. 189,422 filed on May 2, 1988, and entitled AUTOMATIC WIRE DISPENSER (now U.S. Pat. No. 4,899,945). The machine described in such patent application includes a wire guide mounted for oscillating movement in response to changes in wire tension, and has a drive and control system which in response to the position of the wire guide progressively increases and decreases the rate of rotation of the spool to pay out the wire faster in response to an increase in wire tension and at a decreased rate on reduction of wire tension. Although the wire dispenser in the above said patent application works satisfactorily for many uses, the control mechanism involves a number of pulleys which are more complicated than desired and it cannot handle dispensing of wire at desired higher rates, particularly at high speed stops and starts.

The object of the present invention is to provide an improved automatic motorized dispenser that is simple in construction, simple to operate, inexpensive and accommodates wide ranges of operating conditions, particularly at higher rates of dispensing than has been accomplished by previous automatic dispensers.

SUMMARY OF THE INVENTION

Although this specification describes the invention in conjunction with wire dispensing, for purposes of simplicity, it should be understood that the machine is equally useful and applies to many different types of elongated flexible elements, such as nylon string, flat steel, cable rope and other related elements.

In accordance with this invention, a guide means is mounted for rotation substantially about the axis of rotation of the spool or drum. This guide means includes at its end a guide means that travels on the arc of a circular path which is located in a position that regardless of the position of the guide member on the path the wire from the carrier, that is, the spool or drum, can be threaded through the guide means so that the wire can be pulled easily off the carrier as the carrier is rotated. The position of the circular path for a spool is preferably on a plane extending between the two end plates of the spool. The position of the arcuate path for a drum is on an imaginary cylinder extending through the wire coiled within the drum. In either construction, the wire can be pulled off the spool or the drum without interference by the spool or drum structure.

A wire guide is located on the axis of rotation of the wire carrier at a position based a greater distance from the carrier than the rotatable wire guide. Thus, when the wire from the carrier is threaded through the rotatable wire guide and then through the stationary wire guide spaced therefrom, a tension force such as a pull on the wire causes the rotatable wire guide to follow the arcuate path described above. The position of the rotatable wire guide on this arcuate path controls the speed of a motor which rotates the wire carrier. Thus a greater pull or tension on the wire moves the wire guide along the arcuate path to increase the speed of the motor which rotates the wire carrier. Accordingly, wire is fed at a higher rate to the machine demanding it which in turn reduces the pulling force or tension on the wire. This causes the rotating wire guide to stay at its then position or regress in the direction in which it originally started to slow down the motor. If it regresses, it also takes up any wire slack resulting from the reduced speed of the spool and less demand for the wire.

In the preferred form of this invention, a spool is mounted on a frame for rotational movement about a vertical axis. A potentiometer assembly is located above the spool with its actuator located on such vertical axis of rotation. A guide arm is connected to the actuator of the potentiometer. This arm extends radially outwardly and downwardly to a position located radially outwardly of the spool on an imaginary plane extending between the upper and lower plates of the spool. On the very end of the arm located on this plane is a guide means such as an eye for receiving wire through it.

Mounted above the potentiometer assembly is a stationary wire guide which also receives the wire therethrough and from which the wire proceeds to the machine demanding and utilizing the wire. The stationary wire guide and the guide means on the end of the arm are located in positions where a pull on the wire threaded through the first guide means located on the rotatable arm and then through the upper or second, stationary guide means causes the arm to rotate by reason of the wire wanting to straighten out. As a result, the starting of the wire feed occurs quite slowly and as the feed requirement is increased the pull or tension on the wire rotates the arm actuating the potentiometer which in turn increases the speed of the motor controlled by the potentiometer causing the spool to rotate at a greater speed depending upon the degree of pull or tension applied to the wire.

When the demand for wire decreases, the tension on the wire decreases causing the guide arm by means of a biasing means to reverse its direction of travel. In so doing the speed of the drive motor decreases. One would expect slack to be created in the wire as a result of the combined reduction in speed of the spool and demand for the wire. In my invention, any such expected slack is taken up by the guide arm as it travels in the reverse direction along its arcuate path.

When the wire carrier is a drum, basically the same operation occurs. The only difference is that the wire guide control arm is located above the coil of wire in the drum. This location is again such that a pull on the wire from the demand source will rotate the wire guide control arm to control the speed of rotation of the drum.

The present invention is made up of a minimum number of parts as compared to my invention of my previously referred to patent application Ser. No. 189,422 (now U.S. Pat. No. 4,899,945). Further, my dispenser can accommodate much greater speeds. My invention also uses a smaller motor than previous dispensers since the mechanism is so simple that there is very little drag created in the rotation of the wire carrier.

Wire spools of different sizes can also be easily loaded on my dispenser by pivoting or swinging the support for the guide arm and the stationary guide to one side permitting the spool or drum to be loaded on the rotating platform.

These and other advantages and features of the present invention are described in detail below an shown in the attached drawings

DESCRIPTION OF THE PREFERRED EMBODIMENT

Figure 1:
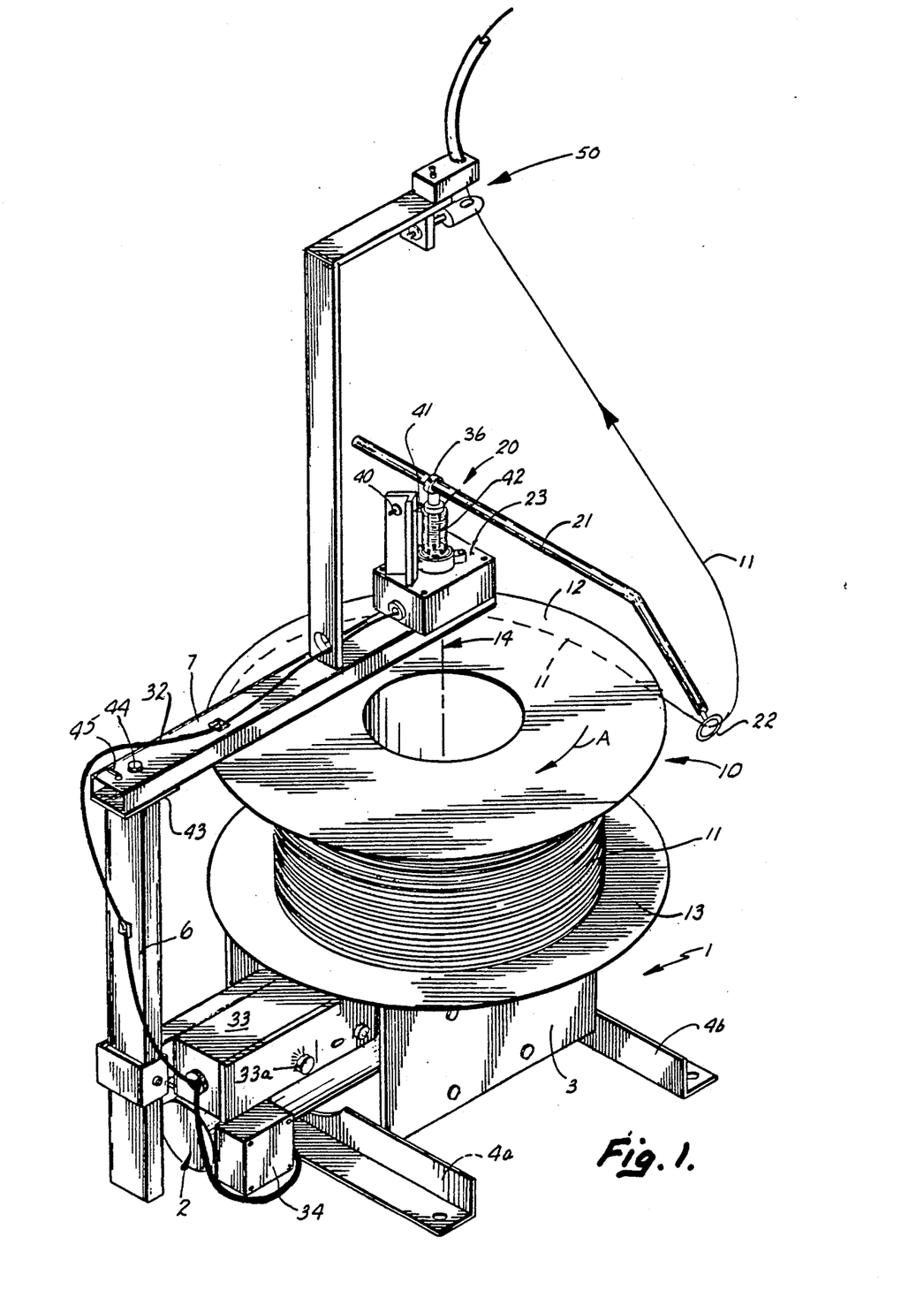
FIG. 1 is a side elevational, perspective view showing my automatic wire dispensing machine in operation.

Referring to FIG. 1 of the drawings, the automatic wire dispensing means includes the rotatable support assembly 1 for supporting a wire carrier 10 which in the form shown is a spool having a coil of wire 11 wound thereon. The spool includes the two end plates 12 and 13 wound on the spool about the axis 14 so that the wire can be removed from the spool by exerting a pull on the wire and rotating the spool in the direction indicated by the letter "A". The spool is rotated by the motor 2, the actuation and speed thereof being controlled by the motor control assembly 20 mounted above the spool for the purpose which will be explained hereinafter. The wire 11 is pulled off of the spool 10 through an eye 22 mounted on the end of the arm 21 and then passed through the wire guide assembly either the arm 21 or guide 22 are insulated for use in dispensing welding wire for a welding operation. The guide eye 22 and the wire guide assembly 50 is located in positions wherein if the spool is not rotating at a speed to accommodate the unwinding of the wire at a desired rate, the arm will rotate causing an adjustment of a potentiometer located in the potentiometer box 23 which adjusts the speed of the motor 2 and consequently the rotational speed of the spool 10, all as will be explained hereinafter.

Figure 2:
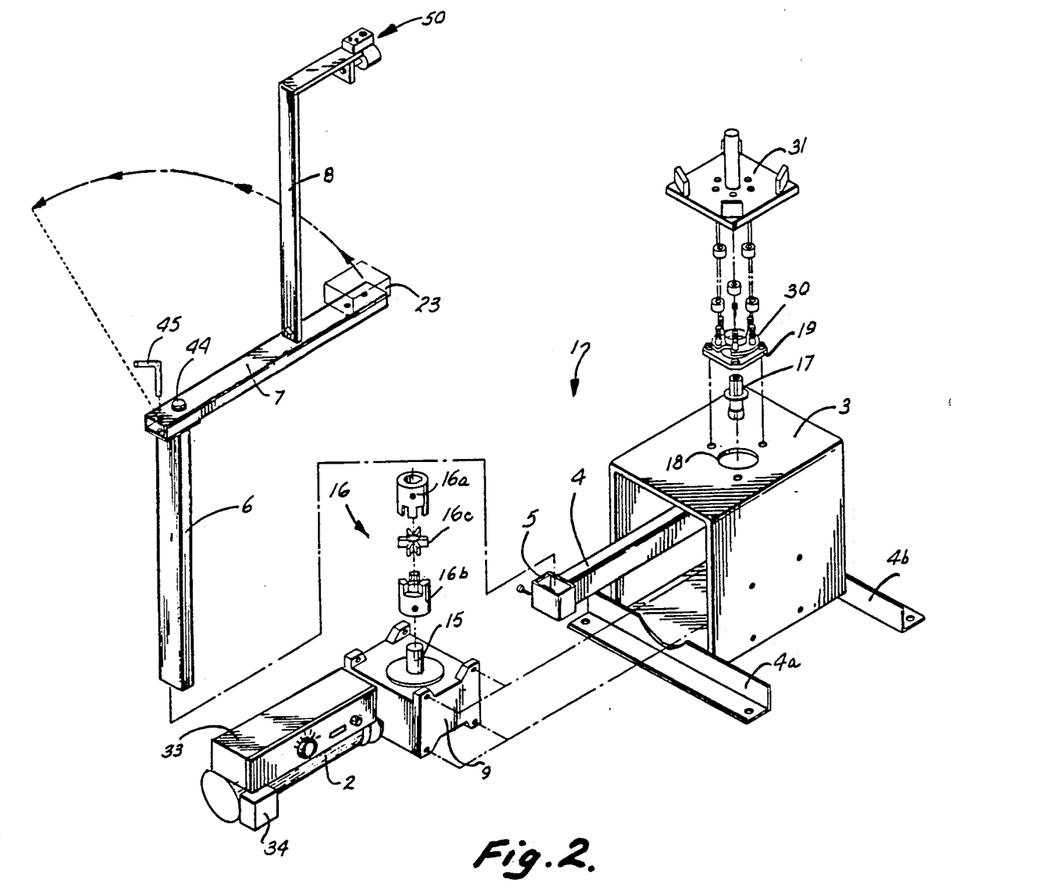
FIG. 2 is an exploded perspective view showing some of the components of my machine, particularly the rotatable wire carrier support, drive means for the wire carrier and the upright support brackets for the potentiometer control assembly and the wire guide control arm.

FIG. 2 discloses in greater detail the rotatable support assembly 1 which includes a frame comprised of a housing 3 mounted on a pair of parallel bars 4a and 4b.

Extending from the top wall of the housing 3 is a bracket 4 having located on the end thereof the sleeve 5 for receiving the upright support bar 6 which supports the horizontal bracket 7 on which the potentiometer box 23 is mounted and also the upright support member 8 which is bent at its upper and to support the wire guide assembly 50.

Mounted in the housing 3 is a right-angle gear box 9 having an output shaft 15 which is driven by the motor 2 through the gear box 9. Attached to shaft 15 is the coupling 16 comprised of three parts including top and bottom parts 16a and 16b with a resilient spider member 16c therebetween to provide a desired resiliency to the connection. Shaft 17 is keyed to coupling 17 which extends through the opening 18 in the top of housing 3. A bearing plate 19 is secured to the top wall of housing 3 and rotatably supports a base plate 30 to which is secured the platform 31 which supports the wire spool 10. This platform 31 can take many different forms for supporting the spool 10.

Figure 3:
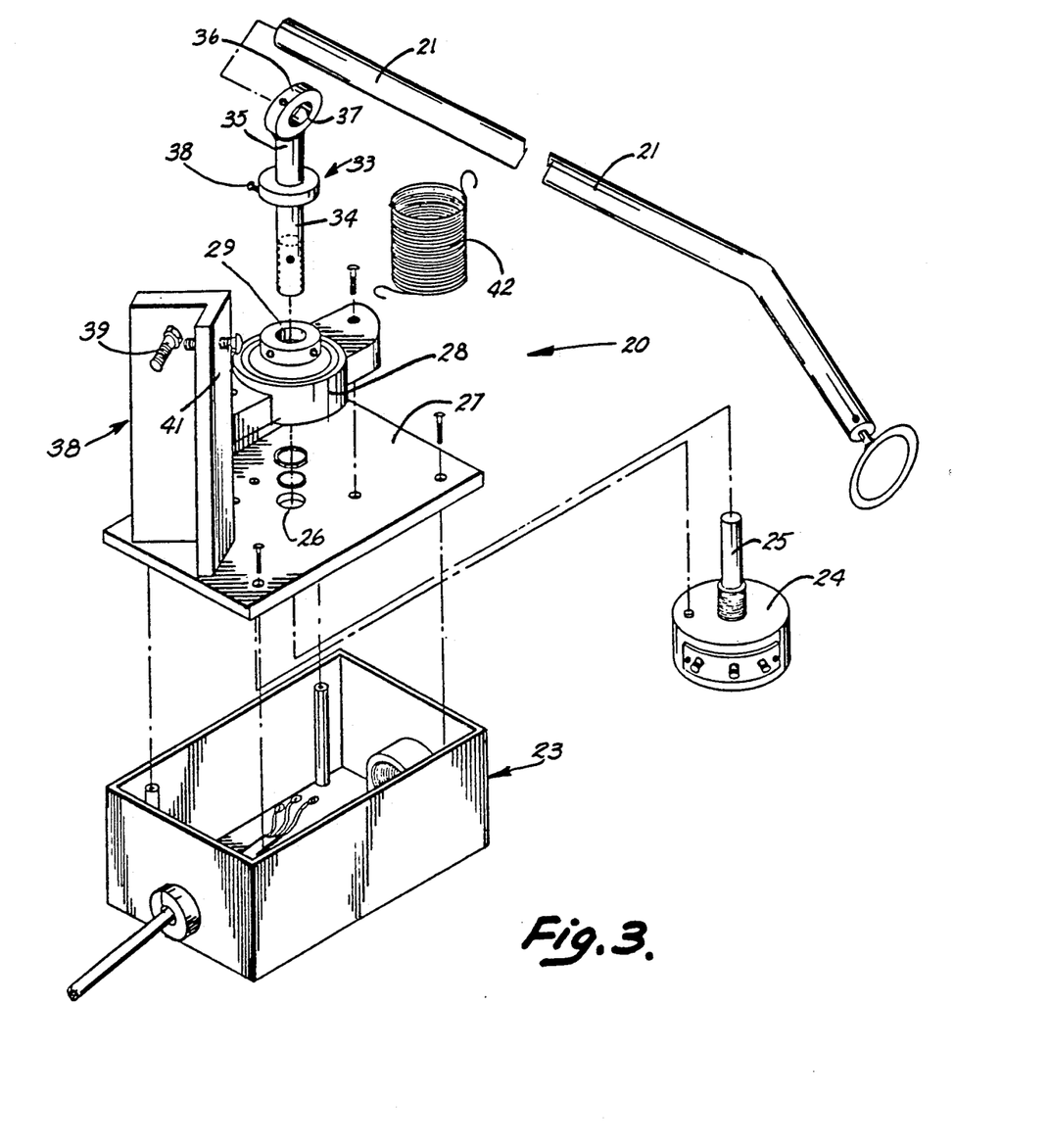
FIG. 3 is an exploded, perspective view of the potentiometer motor control assembly.

FIG. 3 discloses the construction of the motor control actuator assembly 20 which is connected by an electrical cord 32 to the motor controller located in boxes 33 and 34 for the motor 2 (FIG. 1). The motor control actuator assembly 20 includes a potentiometer box 23 in which is located the potentiometer 24 having a shaft 25 extending upwardly through an opening 26 in the top 27 of the box 23. The shaft also extends into the opening 29 of bearing 28 which is mounted on the top 27 of the box 23. A holder 33 for the wire guide control arm 21 includes a lower end 34 having a cylindrical section and an upper end 35 having the sleeve 36 which receives the wire guide control arm 21 which is adjustably secured in the opening 37 of the sleeve 36. A set screw 39 is provided to affix arm 21 within the sleeve 36.

The lower end 34 of holder 33 is mounted in the opening 29 of the bearing 28 and its cylindrical lower end receives the shaft 25 of the potentiometer 24. Thus, with this arrangement, rotation of arm 21 is transmitted to rotation of the rotatable part (not shown) of the potentiometer which controls the speed of the motor and consequently the speed of rotation of the wire spool in the direction "A" as designated in FIG. 1.

Figure 4:
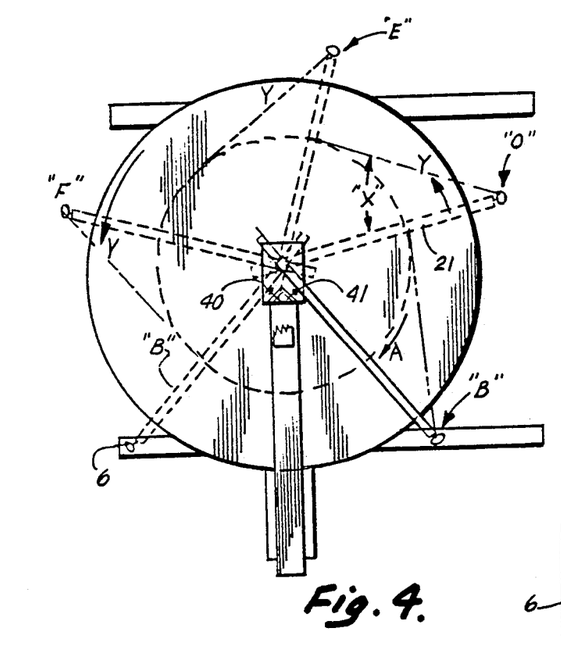
FIG. 4 is a top plan view of my machine illustrating in phantom various positions of the wire guide control arm for actuating the potentiometer motor control.
Figure 5:
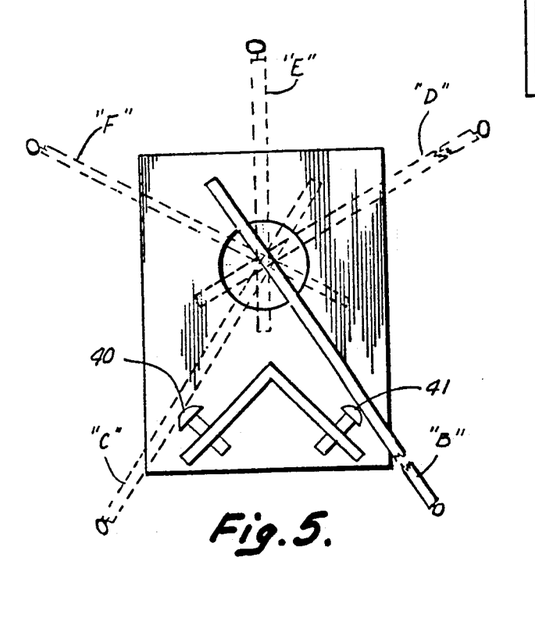
FIG. 5 is a sketch of the potentiometer control and illustrating the stop means for the wire guide control arm.

In order to limit the rotational movement of arm 21 and consequently the actuation of potentiometer 24, a stop means 38 is provided extending upwardly from the top 27 of the potentiometer box. This stop means 38 comprises the V-shaped member having the adjustable bolts 40 and 41 mounted at the same level as the arm 21 so that arm 20 will strike such bolts when rotated. Further, a torsion spring 42 is provided for biasing the arm in a clockwise direction. Thus, when not in operation, the arm 21 is biased against the bolt 41 and when in operation the pull or tension on the wire calls for the highest speed permitted by the construction, the end of arm 21 strikes the bolt 40. This is illustrated in both FIGS. 4 and 5. Thus, in the position in which the arm is shown in solid lines in FIGS. 4 and 5, the motor is shut off while in the position "B" where the arm strikes the bolt 40, the motor is at its greatest speed permitted by the setting of the bolt 40. Intermediate the positions "B" and "C" such as positions "D", "E", and "F", the motor is rotating the wire spool at different speeds; for example, the speed of rotation of the spool at position "E" is greater than at position "D" and the speed of the rotation at position "F" is greater than position "E".

It should be understood that in the preferred aspect of this invention, the motor controller is of the regenerative type. A regenerative motor controller is a commercially available product and has distinct advantages over conventional DC motor controllers when used in the combination of the present invention. These advantages of a regenerative motor controller are set forth in my patent application Ser. No. 189,422 filed May 2, 1988 and entitled AUTOMATIC WIRE DISPENSER (now U.S. Pat. No. 4,899,945). Such disclosure is incorporated within the disclosure of this invention and, therefore, it is considered not necessary to be repeated. Briefly, it should be understood that the potentiometer 24 is a control potentiometer and that the box 33 contains a trim potentiometer. Thus, the adjustment of the knob 33a controls the maximum magnitude of the control power supply signal established by a given degree of the movement of the arm 21. This makes it possible to vary the incremental and maximum motor speeds over the range of rate variation provided by the movement of arm 23.

It should also be understood that the regenerative controller is adjusted so that when the demand for wire usage stops, the energization of the motors falls just below the point necessary to cause rotation of the motor prior to the engagement of the arm 23 with the stop bolt 41. Leaving the motor partially energized decreases the response time required for rotation to begin again on resumption of wire tension. The adjustment of the system in this fashion requires less movement of the potentiometer to begin rotation of the motor, and eliminates the time that would be required for a gradual development of torque as is necessary to overcome friction. This invention also utilizes the stop bolt 41 to keep the potentiometer from entering the dead spot, the advantage of which is set forth in my co-pending application.

Figure 6:
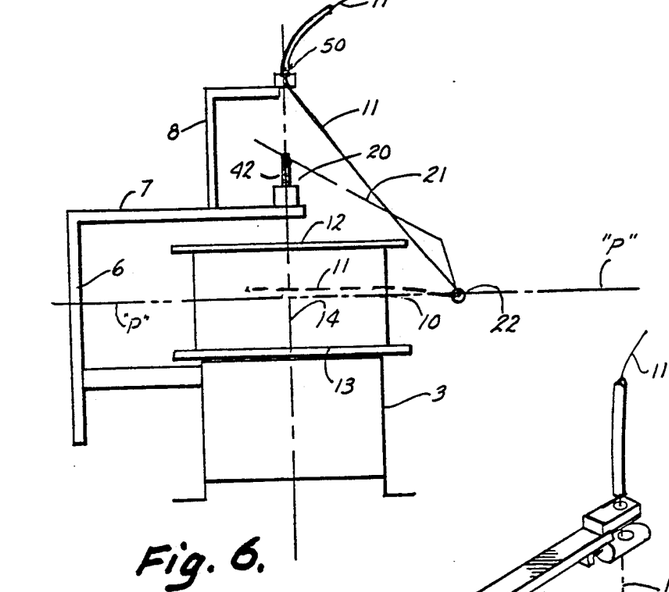
FIG. 6 is a sketch showing the relative positions of the wire carrier, the potentiometer control assembly, including the wire guide control arm, and the upper wire guide means.

In the preferred aspect of this invention, both the actuator for the control potentiometer 24 and the wire guide assembly 50 are located on axis 14 as illustrated by FIG. 6. This is important within the preferred aspect of this invention in that it assures the same speed of rotation of arm 21 in response to the same tension in the wire regardless of the position of the eye 22 on arcuate path. In accordance with the preferred embodiment, the wire guide assembly 50 is constructed of two members each having a vertical opening through which the wire 11 passes.

FIGS. 1 and 2 disclose a means for moving the motor control actuator assembly 20 and the wire guide assembly 50 out of the way for placing spool 10 on the platform 31. A plate 43 is mounted on top of the upright support 6. The horizontal support bar 7 is pivotally mounted by means of the pin 44 extending upwardly from plate 41 and through an opening in the end of the horizontal support bar 7. In order to hold the bar 7 in the position as disclosed in FIG. 1, a key 45 is provided extending through openings in the bar 7 and an opening in plate 41. As disclosed in FIG. 1, the key extending through these openings prevents bar 7 from pivoting about the pin 42. However, the removal of the pin as disclosed in FIG. 2 permits bar 7 to be pivoted about the axis of the pin 42. Thus, when a spool is to be mounted on platform 31, pin 43 is removed and bar 7 is pivoted to one side permitting the spool 10 to be placed on platform 31.

OPERATION

Having described the details of my machine and how the various components operate, the overall operation should be quite evident. The operation starts by loading the wire spool 10 on the platform 31. This is accomplished by removing key 45 and pivoting the bar 7 to one side so as to permit the placement of the spool on platform 31. This is usually accomplished by use of a forked tractor particularly because of the extremely heavy weight of the spool, although smaller spools which are capable of being manually placed on platform 31 can also be unwound by the present invention.

Having placed the spool on the platform 31, the bar 7 is pivoted to the position as disclosed in FIG. 1 and the key 45 is reinserted to hold it in that position. The arm 21 is then adjusted, depending upon the size of the spool, by sliding it in the sleeve 36. Further, the desired rotational movement of the arm through the arc from "B" to "C" is determined and the bolts 40 and 41 are adjusted to establish the degree of permitted travel of the arm 21. The position of the end of arm 21 which locates the eye 22 is located on a plane "P" (FIG. 6) so that the wire 11 can be pulled off the spool without any interference from the structure of the spool such as the end plates 12 and 13. Further, the eye 22 has to be located radially outwardly of the wire a sufficient distance so that the angle "X" between the wire and the arm 21 will cause the arm to rotate when the pull or tension on the wire is created by the drag of the spool.

As the arm 21 rotates, by reason of tension on the wire created by the demand for the wire being greater than what the spool permits, it actuates the potentiometer 24 which controls the speed of the motor. When arm 21 rotates in the direction "Y" (FIG. 4), the speed of the variable speed motor 2 increases until the rotational speed satisfies the wire demand. When the demand decreases which reduces the tension on the wire, the arm is biased by torsion spring 42 in a direction opposite to direction "Y" and the speed of the motor is correspondingly reduced. Thus, a greater rate of demand for the wire increases the tension on the wire causing arm 21 to rotate in the "Y" direction which increases the speed of rotation of the spool 10 and a decrease in the tension of the wire permits the arm to move in the opposite direction to the direction "Y" which decreases the speed of rotation of the spool 10. Accordingly, my machine is capable of adjusting to the rate demands of the wire. As explained in my co-pending application Ser. No. 189,422 (now U.S. Pat. No. 4,899,945), the variable speed motor controlled by a regenerative DC drive accelerates and decelerates the spool at constant rates, regardless of the weight of the spool.

My invention eliminates any wire slack which might normally be expected by the slowing down and/or completely stopping of the demand for wire. For example, slowing down or stopping of such wire demand results in a slowing down of the rotation of the spool at a rate which one would expect would create a slack in the wire being paid off the spool. In my invention, the wire guide control arm biased by torsion spring 42 takes up all of such expected slack by rotating in the same direction "A" as spool 10.

It is evident from the above description that I have provided a substantially less complicated apparatus than that disclosed by the prior art. The machine is compact permitting it to be used in pallettier racking. In addition, the rate of dispensing wire is substantially greater and the possibility of the wire fouling up because of the use of complicated pulleys to take up accumulated wire slack and the like is greatly reduced. In addition, the size of the motor requirements is substantially less.

MODIFICATIONS

Figure 8:
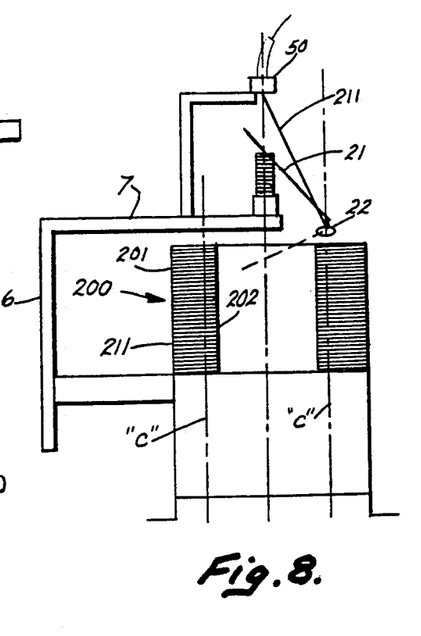
FIG. 8 is a sketch of my automatic dispensing machine illustrating its use on wire coil stored in a drum.

FIG. 8 illustrates in sketch form the use of my machine with a drum 200 containing a coil of wire 211. The drum 200 is made up of concentric cylinders 201 and 202 between when the which is coiled. In this embodiment the arm 21 is directed downwardly so that the guide eye 22 is located above the drum and on an imaginary cylinder "C". Otherwise, the machine and its operation is substantially the same.

Figure 7:
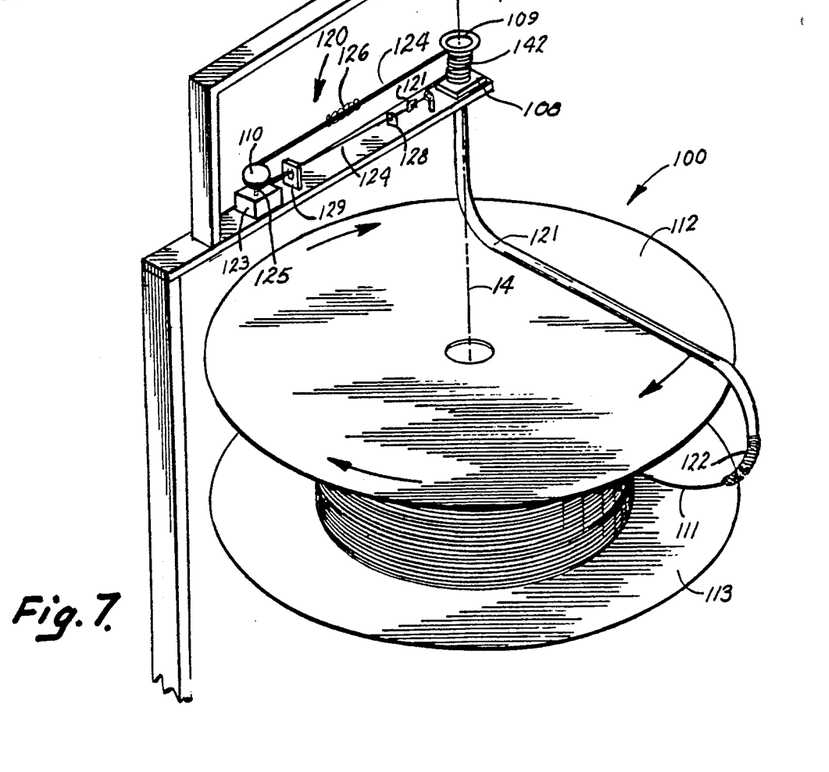
FIG. 7 is a partial, side elevational, perspective view of a modified automatic wire dispensing machine in which the potentiometer control assembly is constructed differently in order to accommodate wire which requires the wire guide control arm to rotate more than one revolution.

Some requirements for unwinding wire such as in a spring making machine requires even higher demand rates for the supply of wire. Such high rate demands require a longer time for the rotating spool to come up to the desired speed and also requires accommodating the high inertia created on the wire carrier when it is slowed down or stopped. In addition, some means is required to take up the attendant accumulation of wire slack. To solve this problem, I conceived of rotating the wire guide control arm more than one revolution around the wire carrier so that more time is given for the spool to reach the desired speed and to slow down when the demand us stopped. Rotating the wire guide control arm more than one revolution about the wire carrier is impossible with the apparatus described above. FIG. 7 discloses a modification in which the wire guide control arm can rotate around more than one revolution.

FIG. 7 is a sketch which discloses the spool 100 having a top plate 112 and a lower plate 113. The wire guide control arm 121 comprises a tube journaled or rotatably mounted on the end of the horizontal bar 107 by means of a bearing 108. The tube 121 includes on its outer end a spring 122 serving the function of a guide. Tube 121 extends upwardly above the bearing 108 and terminates in a pulley 109. A torsion spring 142 is provided between the pulley 109 and the bearing 108 for the purpose of biasing the arm in the direction represented by the arrow "Z" which is opposite to the direction in which the arm 121 rotates in response to a tension exerted on the wire 111. The rotation of the arm takes place in exactly the same manner as described above.

The primary difference is in the motor control assembly. This assembly includes the bearing 108, the pulley 109, and spring 142 which cooperate with a newly designed potentiometer control actuator 120. Potentiometer control 120 includes the potentiometer box 123 in which is located a potentiometer (not shown) and a second pulley 110 connected and provided for rotating the shaft 125 is arranged to control the potentiometer located within the box 123. Actuation of the potentiometer is in response to the rotation of the arm 121 which can rotate more than one revolution since there are no stops like that previously described in relation to FIG. 1. Actuation of the potentiometer throughout a much longer range than that of FIG. 1 can be accomplished in many different ways including a gear reducer between the shaft 125 and the potentiometer within the potentiometer box 123.

The pulley 110 is rotated by a belt 124 attached to pulley 109 and passing around the pulley 110. A stationary stop member 129 is mounted on bar 107 and movable stop member 128 is mounted on the belt 124. Intermediate the ends of the belt 124 are the springs 126 and 127. Rotation of the arm 121 winds the belt 124 on the pulley 109 causing the stop element 128 to move and pulley 110 to rotate to adjust the potentiometer causing the motor controlled by the potentiometer to move at a greater speed. The arm 121 rotates until stop member 128 engages the stop member 129. This motor control assembly permits the arm 121 to rotate a distance depending upon the relative positions and arrangement of stop members 128 and 129 and the relative sizes of the pulleys 109 and 110. It should be understood that this sketch illustrates one embodiment that can be utilized for permitting the wire guide control arm 121 to rotate more than one revolution and that other arrangements are possible.

It should be obvious from the above description that I have invented a simply constructed automatic wire dispenser with a minimum number of parts but capable of operating with a smaller horsepower motor at a relatively higher rate of dispensing and with minimum chance of fouling the wire.

It should be understood that the foregoing description merely represents a preferred embodiment of the invention and that other embodiments can be devised using the concepts without departing from the spirit of the invention. Also, other arrangements and details and changes can be made in the machine described without departing from the spirit and scope of the invention. Therefore, the scope of my invention shall be only as set forth in the following claims.

The embodiments of the invention in which an exclusive property or privilege is claimed are defined as follows.

I claim:

1. An automatic dispenser for elongated flexible elements including a frame, means on said frame for supporting an elongated element carrier for rotational movement about a given axis during the removal of said element from said carrier; drive means for rotating said carrier about said axis at variable speeds; and control means for controlling the actuation and variable speed of said drive means in response to the tension exerted on said element; said control means including a rotatable means, the degree of rotation of said rotatable means determining the speed of said drive means and rotational speed of said carrier; the improvement comprising:

a first guide means mounted for rotation substantially about said given axis; said first guide means having a guide member adapted to receive therethrough and guide an elongated flexible element received from said carrier;

a second guide means located at a spaced position from said first guide means and adapted to receive said element after the element is passed through said first guide member; said second guide means being located with relation to said first guide means so that a tension exerted on said element after passing through said first and second guide means induces said guide member of said first guide means to follow a circular path in one direction about said given axis, the degree of rotation of said guide member along such rotational path being proportionally dependent upon the tension exerted on the element whereby the greater the tension on said element the greater degree of rotation of said guide member;

means for biasing said guide member to rotate about said given axis in a direction along said circular path opposite to said one direction;

said first guide means being operatively connected to said rotatable means causing said control means to control the degree of rotation of said rotatable means in proportion to the tension on said element and thus control the speed of said drive means and rotational speed of said carrier in proportion to the tension on said element whereby increase of tension on said element proportionally increases the rotational speed of said carrier and decrease in the tension on said element proportionally decreases the rotational speed of said carrier.

2. The automatic dispenser of claim 1 in which the first guide means is an arm having a guide member; said first guide means being pivoted about the given axis and extending radially outwardly of said axis where the guide means regardless of the degree of rotation of said arm is always in a position wherein the element on said carrier can be pulled off the carrier from such position as the carrier is rotated.

3. The automatic dispenser of claim 2 in which the second guide means is located substantially on said given axis and spaced axially from said carrier a greater distance than said first guide means.

4. The automatic dispenser of claim 1 in which the second guide means is located substantially on said given axis and spaced axially from said carrier a greater distance than said first guide means.

5. The automatic dispenser of claim 1 in which the rotatable means is a movable part of a potentiometer and the drive means includes a variable speed motor, the speed of which varies with the position of the movable part of the potentiometer.

6. The automatic dispenser of claim 1 in which stop means is provided to establish a start position and a limit position at which positions the first guide means is restricted in the degree of rotation along said rotational path.

7. The automatic dispenser of claim 1 in which the rotatable means is a movable part of a potentiometer and the drive means includes a variable speed motor, the speed of which varies with the position of the movable part of the potentiometer; biasing means urging said first guide means to a start position in a direction opposite to that induced by tension exerted on the end of said element; said drive means being inactivated when said first guide means and said rotatable means are in said start position and the speed of said drive means increases as the first guide means rotates along said rotational path in a direction induced by tension exerted on the end of said element and decreases as said first guide means rotates in the opposite direction; and stop means provided to establish said start position and a limit position at which positions the first guide means is restricted in the degree of rotation along said rotational path.

8. The automatic dispenser of claim 1 in which stop means is provided to establish a start position and a limit position at which positions the guide arm is restricted in the degree of rotation along said rotational path.

9. In a combination of the automatic dispenser of claim 1, a carrier comprising a spool rotatably mounted on a vertical axis and having an upper plate and lower plate spaced therefrom with the element being wound between said upper and lower plates; said rotational path of said guide member being circular and located radially outwardly of the periphery of said plates and on an imaginary plane extending between said upper and lower plates.

10. In a combination of the automatic dispenser of claim 1, an elongated flexible element carrier comprising a drum having upright concentric cylindrical support means supporting element coil therebetween; said rotational path of said guide member being a circle located above said coil on an imaginary cylinder extending through said coil.

11. In an automatic dispenser for elongated flexible elements having a frame with rotatable support means adapted to rotatably support an element carrier about a vertical axis, said carrier having an element wound thereon about said axis;

an arm support means associated with said frame;

a guide arm;

said arm support means rotatably supporting said guide arm above said rotatable support means substantially about said axis;

a guide means supported substantially on said axis above said guide arm for receiving and guiding an element as tension is applied thereto;

variable speed drive means for rotating said rotatable support means;

a guide element on said guide arm;

said guide arm extending from said axis to a position where said guide element can receive and guide an element coiled on said carrier whereby tension exerted on an element extending through said guide element and said guide means induces rotation of said guide arm in one direction about said axis along a rotational path; rotation of said guide element along such rotational path being proportionally dependent upon the tension exerted on the element whereby the greater the tension on said element the greater degree of rotation of said guide element;

means for biasing said guide element to rotate about said given axis in a direction along said circular path opposite to said one direction;

said first guide element being operatively connected to said rotatable means causing said control means to control the degree of rotation of said rotatable means in proportion to the tension on said element and thus control the speed of said drive means and rotational speed of said carrier in proportion to the tension on said element whereby increase of tension on said element proportionally increases the rotational speed of said carrier and decrease in the tension on said element proportionally decreases the rotational speed of said carrier.

12. The dispenser of claim 11 in which the means for controlling the variable speed of said drive means includes a potentiometer.

13. In a combination of the automatic dispenser of claim 11, a carrier comprising a spool rotatably mounted on a vertical axis and having an upper plate and lower plate spaced therefrom with the element being wound between said upper and lower plates; said guide arm extending radially outwardly of said plates.

14. The dispenser of claim 11 in which the arm support means also supports said guide means above said rotatable support; and means for permitting said arm support means to swing to the side away from said position over said rotatable support whereby a carrier can be mounted on and removed from said rotatable support.

15. In a combination of the automatic dispenser of claim 11, a carrier comprising a spool rotatably mounted on a vertical axis and having an upper plate and lower plate spaced therefrom with the element being wound between said upper and lower plates; said rotational path of said guide element being circular and located radially outwardly of the periphery of said plates and on an imaginary plane extending between said upper and lower plates.

16. In a combination of the automatic dispenser of claim 11, an element carrier comprising a drum having upright concentric cylindrical support means supporting an element coil therebetween; said rotational path of said guide element being a circle located above said coil on an imaginary cylinder extending through said coil.

17. In a combination of the automatic dispenser of claim 11, a loose coil supported on said rotatable support means; said rotational path of said guide element being a circle located above said coil on an imaginary cylinder extending through said coil.

* * * * *